United States Patent [19]

Loomis

[11] 4,168,667
[45] Sep. 25, 1979

[54] CURTAIN FOR LADING PROTECTION

[75] Inventor: Russell M. Loomis, Palos Heights, Ill.

[73] Assignee: Unarco Industries, Inc., Chicago, Ill.

[21] Appl. No.: 820,572

[22] Filed: Aug. 1, 1977

[51] Int. Cl.² ............................................. B60P 7/00
[52] U.S. Cl. ................................... 105/467; 105/376; 105/489; 105/493; 280/179 B
[58] Field of Search ............. 105/376, 467, 489, 493, 105/494; 280/179 B; 296/24 R; 244/118 R, 137 R; 160/330, 368 R, 196; 16/87 R, 87.2, 87.4 R, 87.4 W, 87.6 R, 87.6 W, 94 D, 95 D, 96 D

[56] References Cited

U.S. PATENT DOCUMENTS

| Re. 27,034 | 1/1971 | Bezlaj | 296/24 R |
|---|---|---|---|
| 3,099,313 | 7/1963 | Peck et al. | 105/467 X |
| 3,585,674 | 6/1971 | Golden | 160/330 |
| 3,782,758 | 1/1974 | Williamson | 105/376 |

*Primary Examiner*—Robert G. Sheridan
*Attorney, Agent, or Firm*—Norman Lettvin; Gerald S. Geren

[57] ABSTRACT

A load-restraining device is disclosed herein for use in lading-carrying vehicles, such as truck trailers. The device includes a curtain which is adjustably suspended from an overhead support that extends laterally across the top of the trailer and is mounted for longitudinal movement therein. The curtain includes laterally-extending pockets, each of which carries a load-restraining belt. Belt hooks on opposite ends of each belt cooperate with belt rails in the sidewalls of the trailer and a belt tensioner or buckle is provided at the center of each belt.

The pockets on the curtain are positioned on the side of the curtain opposite the lading-engaging face, so as to maximize the strength of the curtain and are in a manner which inhibits removal of the belts and reduces pilferage.

A pair of corner flaps are provided for positioning between the lading and sidewalls so as to restrain lateral movement or bunching of the curtain, and vertical corner protectors are also provided for shielding the lading from the restraining belts as they wrap around the corner edges of the lading adjacent each of the sidewalls of the vehicle.

In intercity or over-the-road service, a plurality of identical load-restraining devices can be used to separate the lading into sections.

14 Claims, 12 Drawing Figures

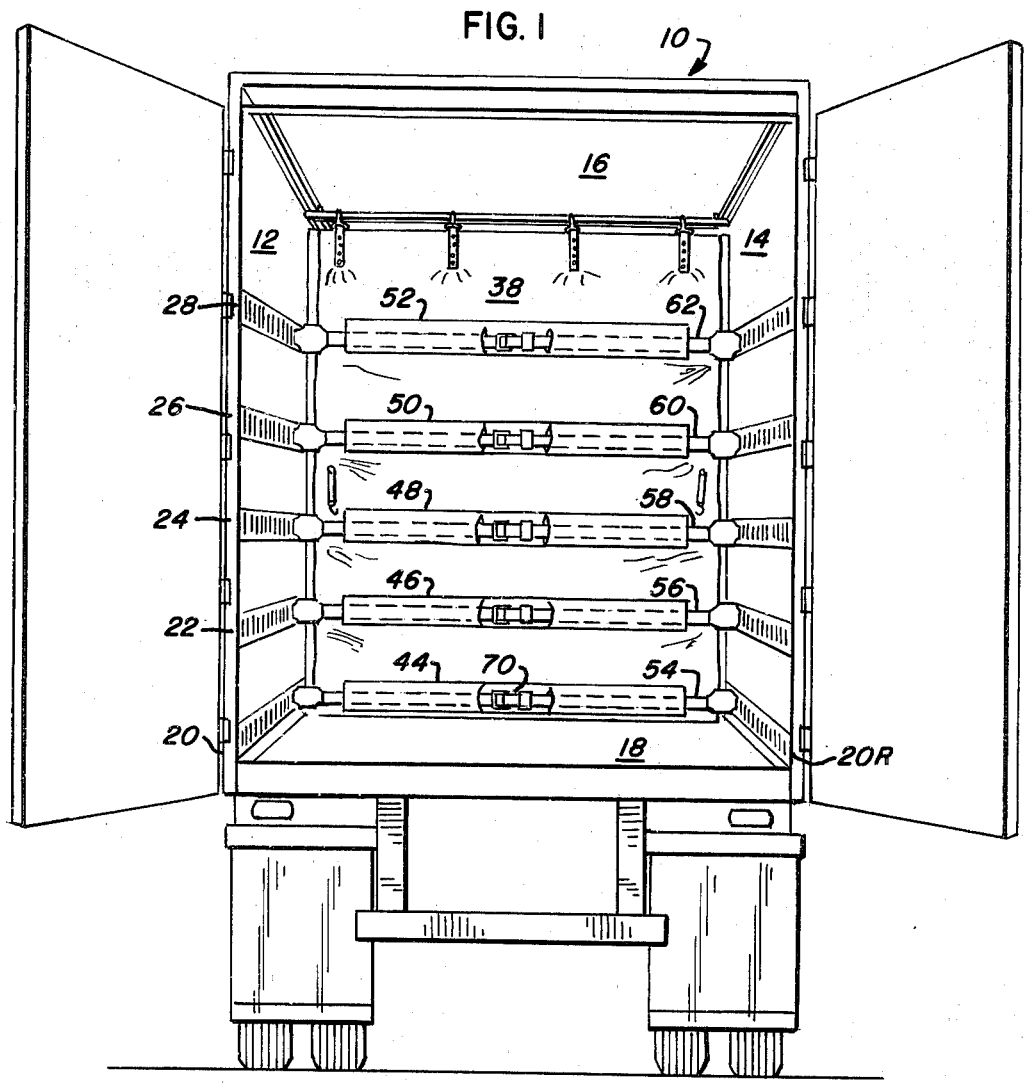
FIG. 1
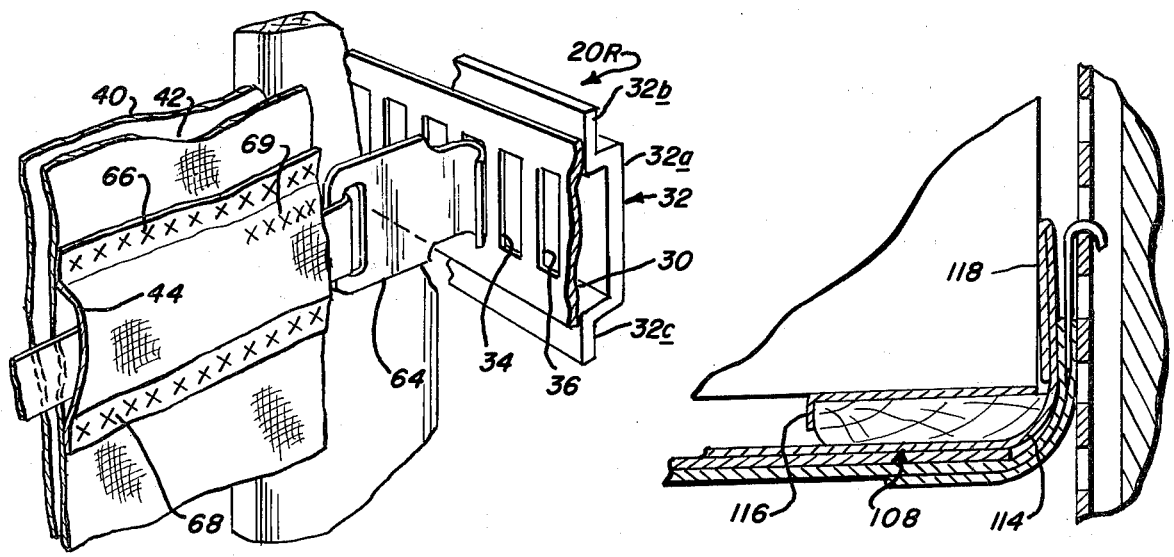
FIG. 2
FIG. 3

CURTAIN FOR LADING PROTECTION

BACKGROUND OF THE INVENTION

This invention relates to load-restrainers; and more particularly, to load-restraining devices for use in lading-carrying vehicles or other lading-carrying containers.

Curtain-type, load-restraining systems for use in lading-carrying vehicles, such as truck trailers which have longitudinal side, top and bottom walls, are disclosed in U.S. Pat. No. Re. 28,788. Such systems include: (1) a plurality of vertically-spaced fasteners or belt rails positioned along the sidewalls of the vehicle; (2) a curtain support which extends transversely across the vehicle adjacent the top wall and which is movable longitudinally within the trailer; (3) a flexible lading-engaging curtain which is suspended from the suppport and extends across the width and height of the vehicle between the sidewalls and the top and bottom walls; and (4) horizontal load-restraining belts which are carried by the curtain and have fasteners at the ends thereof for connection to the vertically spaced sidewall fasteners.

It has been found that when trailers having such a lading-restraining device are "piggy-backed" on railway flatcars, that the load restrainers may not be sufficiently strong to resist the high-impact forces which may occasionally occur during switching of the flatcars. Under such impacting, the side rails and belt connectors may fail. It is therefore an object of this invention to provide a lading restrainer having improved sidewall fasteners and belt connectors.

It has also been found that under high-impact forces the corners of the lading adjacent the sidewalls may be creased or crushed by the load-restraining belts. It is another object of this invention to prevent or minimize damage to the lading by the belts.

Occasionally, vandals have stolen the restraining belts from the pockets. It is therefore yet another object of this invention to provide a structure by which vandalism and pilferage of such belts can be inhibited and minimized.

Furthermore, vandals have stolen entire curtains by cutting the suspension system which supports the curtain. It is therefore another object to prevent or reduce pilferage of the curtain resulting from the severing of the suspension system.

The floor-to-ceiling height of trailers varies and thus, a curtain suitable for use in one trailer may not be suitable for use in another trailer. It is therefore another object of this invention to provide an adjustment in the curtain assembly which can be used in truck trailers having differing floor-to-ceiling distances.

In intercity shipping or delivery, it has become desirable to separate the lading into sections so as to define the lading that is to be delivered at a particular location and also to deter theft of lading by concealing the type of lading being shipped. It is therefore another object to provide a system compatible with the load-restraining system to sectionalize and conceal lading.

These and other objects of this invention will become apparent from the following description and appended claims.

SUMMARY OF THE INVENTION

There are provided by this invention systems which meet the foregoing objects. These systems are suitable for use in lading-carrying vehicles, such as truck trailers and containers of the type presently used for the containerized shipment of goods by land or sea.

The load-restraining system includes improved longitudinally-extending belt rails mounted on the interior sidewalls of the vehicle and J-hooks at the ends of the restraining belts for locking cooperation with the belt rails.

The belt-carrying pockets on the curtain are sewn to the rearward face of the curtain and are positioned so that one or more plies of the curtain are positioned between the belts and the lading. The pockets may be sewn after the belts are positioned therein in such a manner as to inhibit belt removal from the curtain but without impairing the use of the system.

For curtains to be used in piggy-back service, or the like, two vertically-extending corner protectors are secured to the load-restraining curtain for positioning adjacent the sidewalls of the trailer. These corner protectors cooperate to minimize damage to the lading resulting from shifting of the lading or impact forces.

Adjustable hangers are provided to suspend the curtain from the overhead support and permit adjustment of the height of the curtain with respect to the floor. This permits a single-height curtain to be used in trailers or containers having differing floor-to-ceiling dimensions. Moreover, these hangers are constructed with metal clips and rivets which inhibit removal or theft of the curtain itself by vandals.

Furthermore, a plurality of identical lading-restraining curtains can be employed in a single vehicle so as to permit sectionalizing of the lading for ease of delivery or concealment of the lading. In an alternative embodiment, a single lading-restraining curtain can be employed for lading protection and separator sheets can be employed to sectionalize and conceal the load.

In yet a further development, an adjustable lading-restraining curtain has been provided for use in vehicles which employ a decking system of the type disclosed in U.S. Pat. No. Re. 27,034 that provide a level of lading support above the floor.

BRIEF DESCRIPTION OF THE DRAWINGS

FIG. 1 is a perspective view of the rear of a trailer showing a lading-restraining curtain in the lading-engaging position and secured to a set of longitudinally-extending belt rails;

FIG. 2 is a perspective view of a small section of the curtain and a belt rail;

FIG. 3 is a horizontal sectional view showing the relationship of the curtain, a corner protector, a corner flap, a belt hook, a belt rail and lading-containing cartons;

DESCRIPTION OF THE PREFERRED EMBODIMENT

Figure 4:
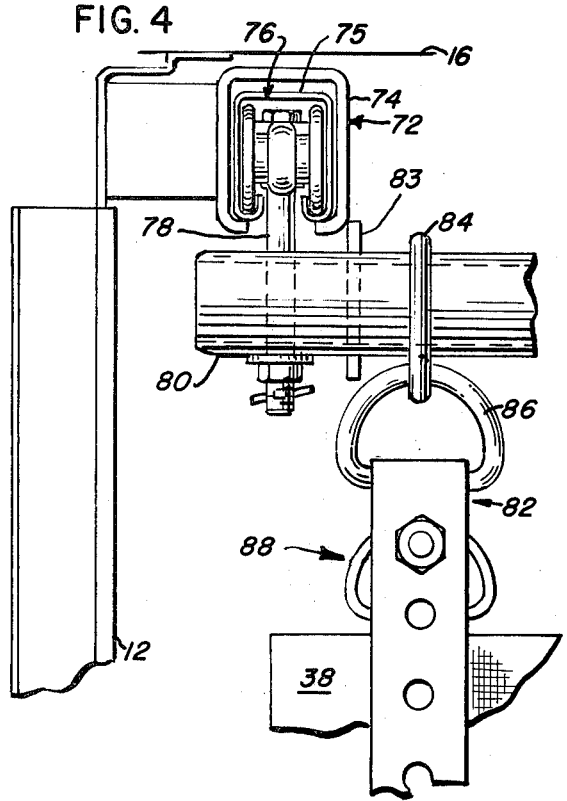
FIG. 4 is a rear elevational view of a portion of the overhead support system for the curtain.

Referring now to the drawings, there is shown a truck trailer 10, which is suitable for piggy-back service and which includes a pair of sidewalls 12 and 14, a top wall or ceiling 16, and a bottom wall or floor 18.

Normally, in piggy-back-type service, five (5) pairs of longitudinally-extending belt rails 20, 22, 24, 26 and 28 are mounted on the sidewalls of the trailer. Each of the rails, such as the right-hand member 20R of the pair 20, includes a faceplate 30 that is welded to a hat section 32 having a web 32a and flanges 32b and 32c. The faceplate has a plurality of rectangularly-shaped, vertically-elongated, hook-receiving apertures, such as 34 and 36. Trailers are manufactured which have vertically-extending columns or posts in the sidewalls, and in such trailers, the belt rails are recessed in the walls between the columns and are secured to the columns. Depending upon the use of the trailer or container, the belt rails may extend for the full length of the sidewall or for only a portion thereof, for example only the rearward section near the door.

Other trailers are manufactured which do not include sidewall columns or posts. In that situation, the belt rails include only a hat section which has been reversed so that the flanges 32b and 32c are positioned against the inside wall surface and are riveted thereto. The hook-engaging apertures are formed in the inwardly-extending web portion 32a of the hat section.

When the five (5) pairs of belt rails are used, the spacing between the bottom three pairs of belt rails 20, 22 and 24 is less than the spacing between the upper belt rails 26 and 28. The distance from the floor to the third rail 24 must not exceed 34 inches, and the spacing between the rails 24 and 26, and 26 and 28 is approximately 21 inches.

The load-restrainer includes a fabric-type curtain 38 that is suspended from a position adjacent the ceiling. The curtain is fabricated from two plies 40 and 42 of a canvaslike material, and five (5) transversely-extending, belt-receiving pockets 44, 46, 48, 50 and 52 are sewn to the rearward facing ply 42 of the curtain 38. However, the curtain may be fabricated from one or more plies.

Each of five (5) horizontally-extending, load-restraining belts 54, 56, 58, 60 and 62 is carried in one of the pockets and is aligned with one of the pairs of belt rails. With the spacing described hereinbefore, the lower three belts will engage a 55-gallon drum and the top belt will be within reach of an average man.

A J-shaped belt hook, such as 64, that opens rearwardly and is adapted to engage a belt rail aperture is secured at each end of each belt. The belt hooks are wider than the belt itself and are wider than the sewn ends of the pockets. The pockets when sewn to the curtain are sewn along lines, such as 66 and 68, but after the belts have been installed, the pockets can be stitched along line 69 to prevent removal of the belt by pulling it inwardly. A belt tensioner or buckle, such as 70, is centrally positioned on each belt for tightening the belt.

Referring now to FIG. 4, the curtain 38 is supported by an overhead suspension system which includes a pair of longitudinally-extending trolley systems, such as 72, which are positioned adjacent the ceiling 16 and each of the sidewalls 12 and 14. Each trolley includes a downwardly-opening channel-like bracket 74 within which is positioned a downwardly-opening rail or track 75 on which a wheeled carriage 76 rolls. A stem or bolt 78 extends downwardly from each carriage through the channel openings in the bracket and rail and is connected to an end of a crossbar or support 80. The support member 80 extends laterally of the trailer and is adapted for movement longitudinally therein on the carriages, such as 76.

Four adjustable and tamper-resistant hangers, such as 82, are provided for cooperation with the support member 80. A roll pin, such as 83, is provided adjacent each end of the support 80 and extends through the support at a position inwardly of the overhead rail 74. The roll pin prevents the hanger 82 from becoming jammed between the bracket 74 and support 80.

Each hanger 82, includes a circularly-shaped ring 84, a D-ring 86, and a clip assembly 88 which fits over the lower leg of the D-ring and is secured to the curtain 38.

Figures 8, 9:
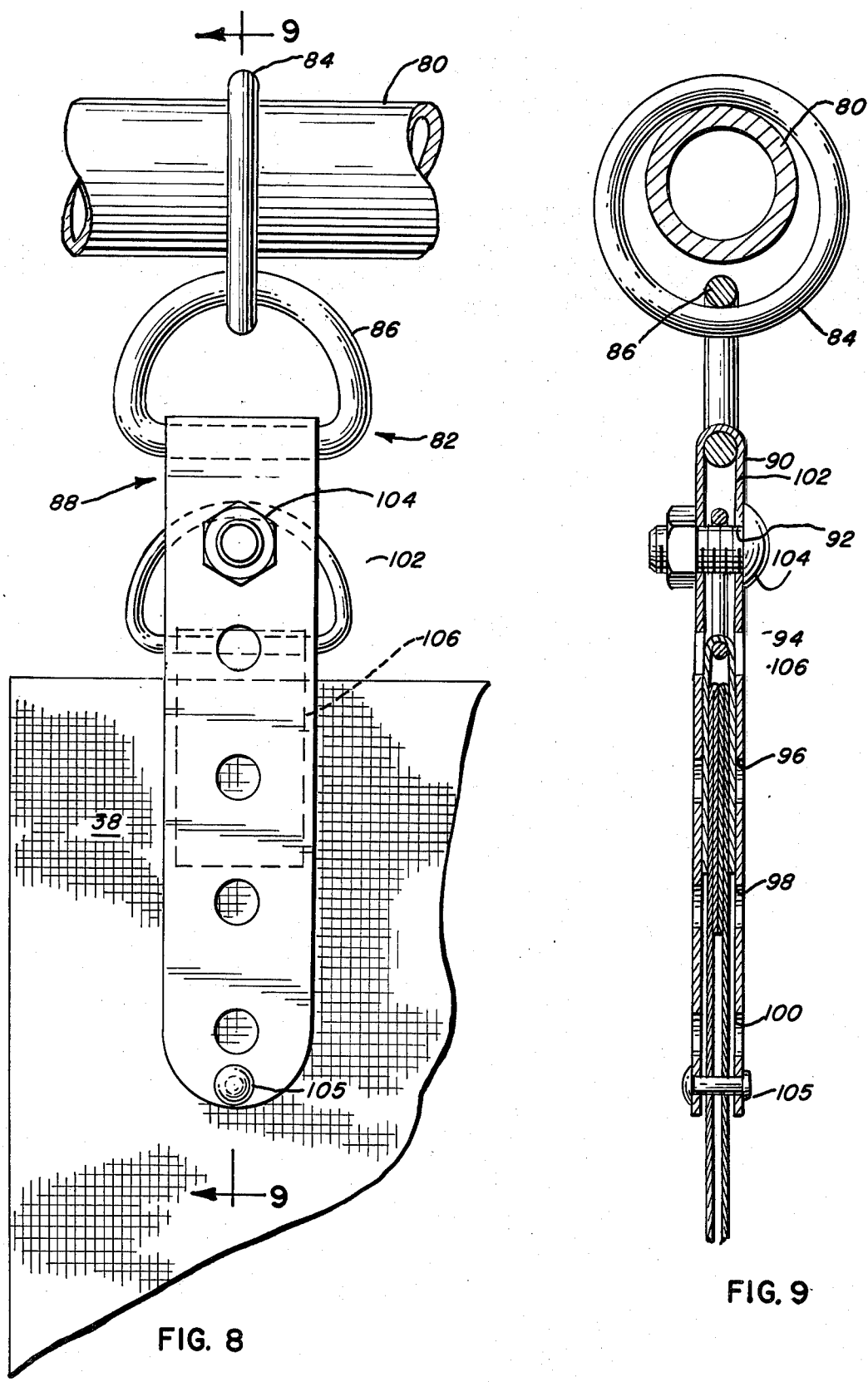
FIG. 8 is an enlarged rear elevational view showing an adjustable and tamper-resistant curtain suspension.
FIG. 9 is a sectional view taken along line 9—9 of FIG. 8 and showing the elements of the suspension.

Referring now to FIGS. 8 and 9, the clip assembly 88 includes an outer U-shaped metal clip 90, which has five vertically-aligned apertures 92, 94, 96, 98 and 100 that extend through both legs of the clip. Another D-ring 102 is positioned within the clip and is held in position relative to one of the apertures by a nut-and-bolt arrangement 104. The lower end of the D-ring 102 supports a fabric or metal loop 106 which is sewn or riveted at its lower ends to the curtain 38. In order to lower the curtain, the nut and bolt 104 are removed and repositioned in one of the lower apertures, which permits the lowering of the curtain relative to the support member 80. After final adjustment is made, a rivet 105 is applied as a deterrent to pilferage.

Figure 5:
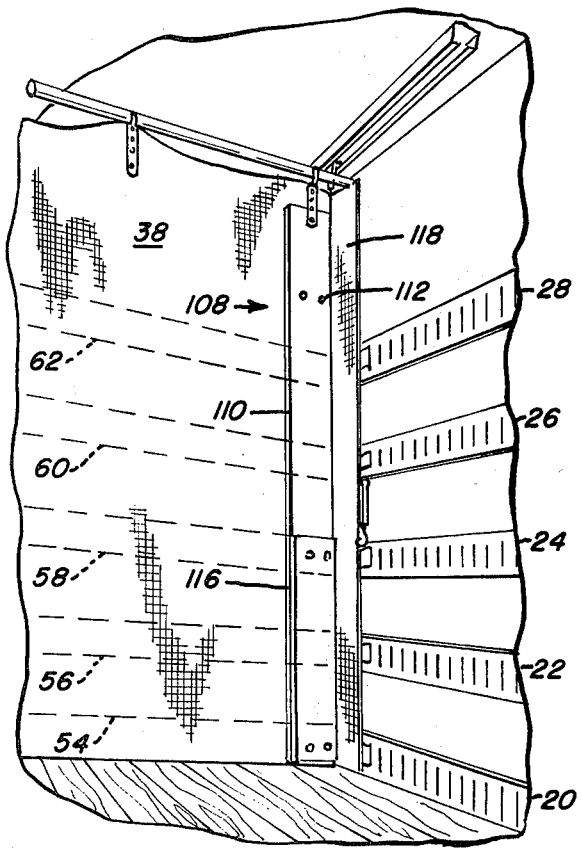
FIG. 5 is a perspective view looking from the inside of a trailer toward the rear thereof showing the curtain, a corner protector and a corner flap.
Figure 7:
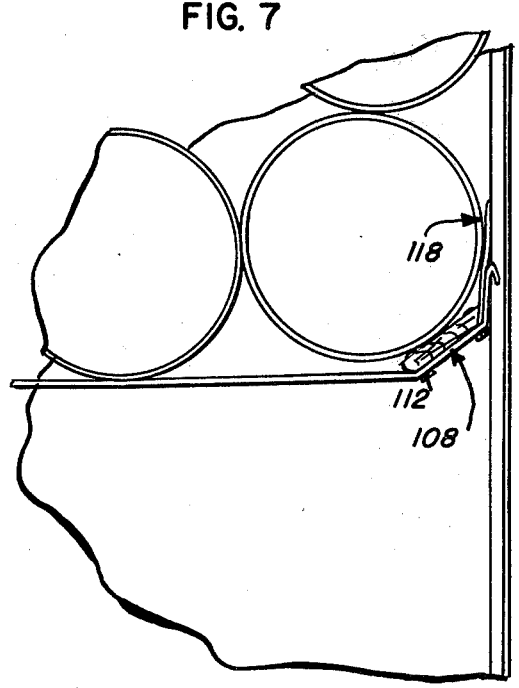
FIG. 7 is a top plan view showing the curtain with the corner protector and corner flap, and with the lading consisting of barrels.

Referring now to FIGS. 3, 5 and 7, for piggy-back service, two corner protectors, such as 108, are provided adjacent opposite ends of the curtain for positioning adjacent each sidewall. Each corner protector includes a rigid, elongated body 110, which is made of plywood or the like, and which extends at least between the top belt 62 and bottom belt 54. Each protector is secured to the lading-engaging sides of the curtain 38 by nuts and bolts, such as 112, as best seen in FIG. 7. The outermost edge 114 of the protector 108 is rounded so as to gently contact the curtain 38 at the corner and minimize damage thereto.

The corner protectors (a) prevent sharp corners of the lading from directly contacting the curtain itself, and (b) act as a bridge between the various load-restraining belts and thereby spreads localized forces between the belts to prevent carton crushing.

It has been found that the ribs on metal 55-gallon drums contacting the corner protector may damage a wooden corner protector. In order to minimize such damage, an L-shaped metal flashing 116 is secured to the lading-engaging side of the corner protector 108. The flashing may extend for the full height of the corner protector but need only extend from the lower belt 54 past the third belt 58 to prevent abrasion resulting from 55-gallon drums.

A corner flap, such as 118, is provided at each of the extreme sidewall edges of the curtain 38. The flap is a multi-layer projection either fabricated from the same material as the curtain or any other durable fabric including resilient, pliable plastics. The flap extends laterally for several inches and is positionable between the lading and the sidewall of the vehicle. The distance across the curtain and between the outer edges of the flaps is greater than the distance between the sidewalls of the trailer. When the flaps are held in position adjacent the sides of the lading, the flaps cooperate to prevent laterally inward movement or bunching of the curtain during shipment.

Figure 6:
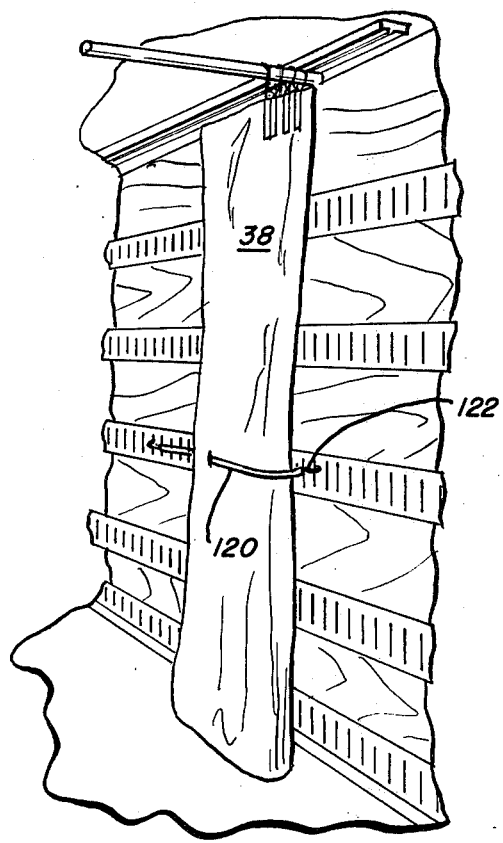
FIG. 6 is a perspective view showing the curtain held in a storage position folded against one of the side-walls by the storage strap.

Referring now to FIG. 6, the curtain is stored by moving it laterally to either sidewall and folding in an accordion-like manner against that wall. A storage strap, such as 120, is provided at each side edge of the curtain. The strap extends through an aperture in the curtain and has S-shaped hooks, such as 122, at each end thereof. The hooks are constructed to engage the belt rail apertures and retain the curtain in the folded storage position against the wall.

In operation, the lading is loaded in the front end of the trailer preferably with a space being left between the sides of the lading and the trailer sidewalls. During loading, the curtain is in its storage position folded against one of the sidewalls. After the trailer is loaded, the curtain is located longitudinally in the trailer by moving the support 80 until the support is substantially aligned with the exposed and unrestrained end face of the lading. The curtain is opened by being pulled laterally across the lading face so as to cover the face. Next, the corner protectors, such as 108, are positioned at the corners of the lading and the corner flaps, such as 118, are fitted in the space between the sidewall of the trailer and the lading. The belts are hooked behind the lading face (i.e., toward the front of the trailer) to the respective aligned belt rails, and the belts are then tensioned using tensioners or buckles, such as 70, so as to draw the belts tightly across the face of the lading and hold the flaps in place.

In the event that lading shifts against the curtain, due to impacts to the trailer, the belts tend to act as a "shock absorber" and take up a major portion of the impact and minimize shifting of the lading. The portions of the curtain between the belts cooperate to retain the load. The corner protectors engage the edges of the lading and prevent localized belt pressure from damaging the load and also sharp corners of the lading from damaging the curtain. If 55-gallon drums are being shipped, the flashing protects the plywood corner protector from abrasion and concentrated barrel rib pressure. The securing of the flaps minimizes movement of the corner protector and curtain toward the center of the truck, since the flaps are tightly held against the side of the lading by the belts.

The foregoing description was generally in connection with a "heavy-duty" load-restraining system which is particularly suited for piggy-back service. In intercity or over-the-road shipments, the forces to which the curtain is exposed are less and the restraining requirements are less severe.

Figure 10:
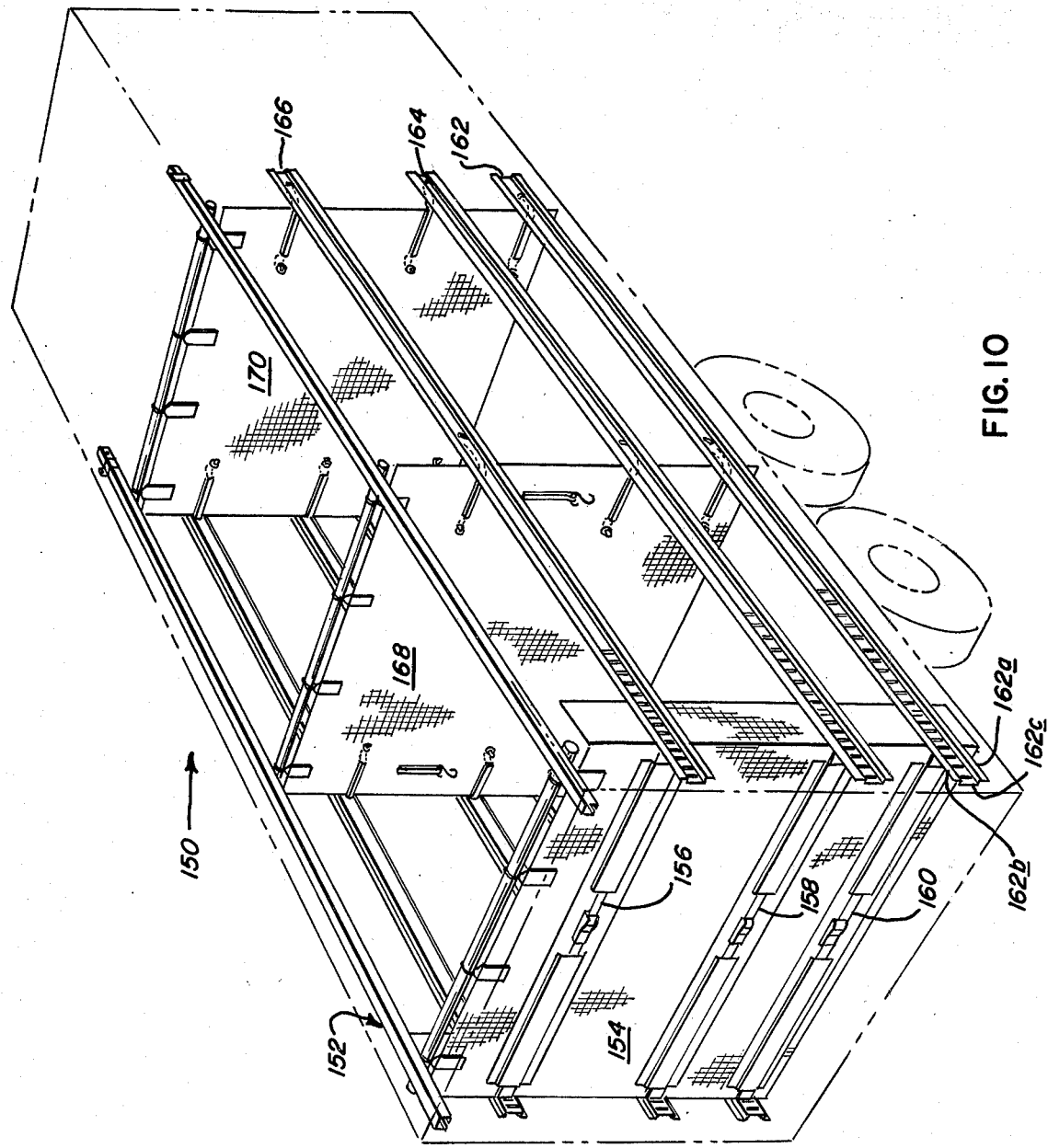
FIG. 10 is a diagrammatic and perspective view of a trailer having a lading-restraining curtain at the rear end and two lading separating sheets.
Figure 11:
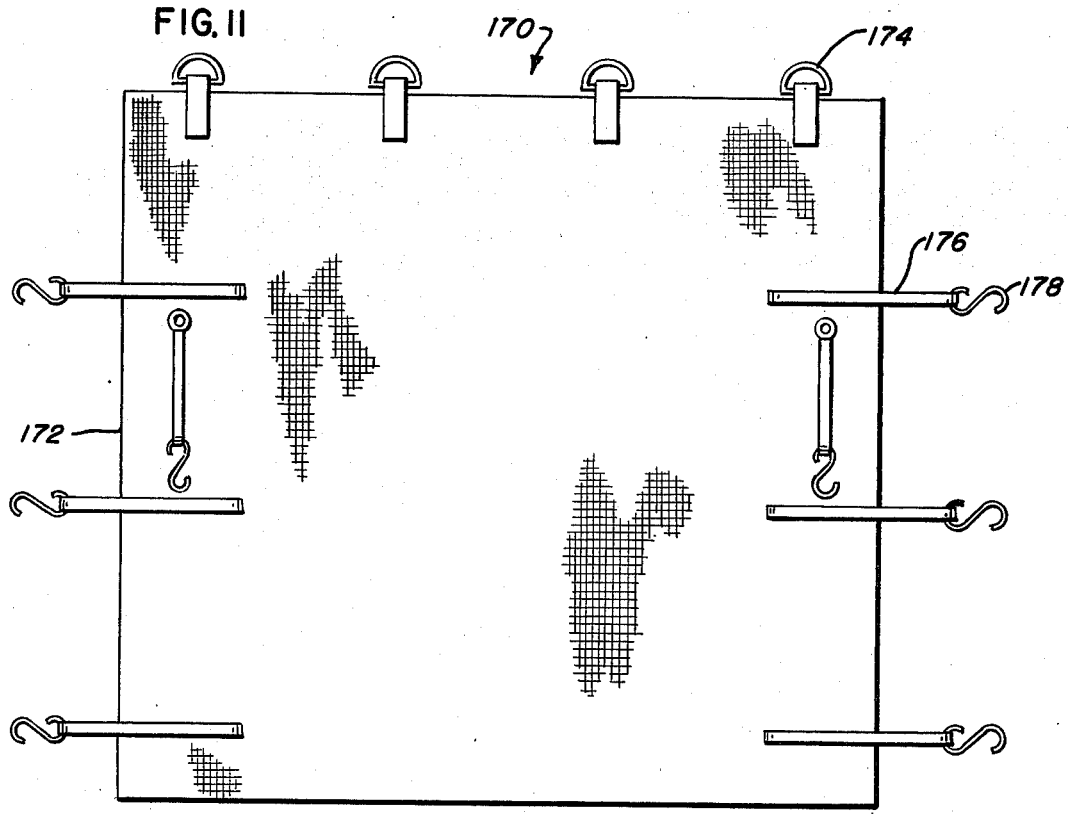
FIG. 11 is an elevational view showing a lading-separating sheet.

Referring now to FIG. 10, there is shown a truck trailer 150 generally for intercity usage. The trailer includes an overhead support system 152 generally from which a curtain 154 is suspended in the same manner as previously described. In this system the curtain is provided with only three belts 156, 158 and 160 which cooperate with three pairs of belt rails 162, 164 and 166. In this type of service, the lower two belts and belt rails are positioned in the lower portion of the trailer to restrain lading on the floor. It will be noted that the belt-rails extend only for a portion of the full length of the trailer and that the rails are formed from a hat-section-type channel wherein the flanges, such as 162a and 162b, are mounted to the trailer wall, and the web section 162c extends inwardly and provides the belt-hook-engaging notches.

It has been found in over-the-road applications that corner protectors, such as 108, are not necessary.

It has been determined to be desirable to separate the lading into compartments so as to clearly define the sections of the load to be delivered at different destinations. Furthermore, it has been found to be desirable to conceal the various sections of the load so as to deter theft thereof. Additional load-restraining curtains, such as 154, can be provided to sectionalize the load.

However, the additional load-restraining capability provided by the extra curtains may not be necessary. Therefore, load separators, such as 168 and 170, are provided for separating and concealing the load sections. Each separator includes a sheet or body section 172 and hangers, such as 174, for suspending the separator from the overhead support. The hangers are like those previously disclosed, are adjustable and tamper proof. A plurality of elastic cords, such as 176, are provided, which are secured at one end to the sheet and have S-hooks 178 at the other end for securement to the belt rails so as to position the separator in the trailer. The elastic cord permits the separator to move with the load as it shifts during transit.

Figure 12:
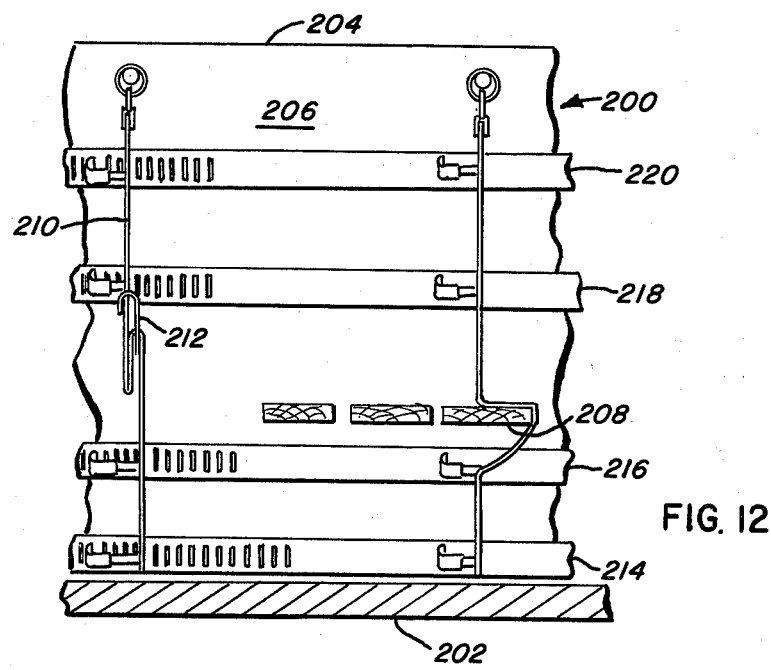
FIG. 12 is a diagrammatic and side elevational view showing an adjustable lading-restraining curtain for use in vehicles which employ decking.

Referring now to FIG. 12, there is seen a portion of a vehicle 200 having a floor 202, ceiling 204 and sidewalls, such as 206, a plurality of decking planks, such as 208, are provided which are movably secured to the sidewalls so as to provide a second surface upon which lading can be placed. Such systems are employed where bulky or odd-shaped loads, such as automotive engines, are shipped. U.S. Pat. No. Re. 27,034 discloses one type of a decking system.

The lading-restraining curtain 210 is similar to that previously described except that its height is greater than the floor-to-ceiling dimension of the trailer. When no decking is present, the height of the curtain is adjusted by a snap, catch or hook arrangement 212 which permits the formation of a fold or cuff in the curtain to take up the extra length. In the embodiment shown, the hook arrangement 212 will engage an upper portion of the curtain so as to form the fold. With the curtain so arranged, it can be used as previously described to restrain a regular load.

However, when decking such as 208 is in position, the fold or cuff is opened so that the curtain can extend forwardly of the rearward edge of the deck 208. The extra length provided by the fold permits the manipulation of the curtain so as to restrain loads above and below the deck.

Belt rails, such as 214, 216, 218 and 220, are provided for securing the curtain in place and are positioned with the rails above and below the decking.

It will be appreciated that modifications can be made to the embodiments disclosed herein without departing from the spirit and scope of this invention.

What is claimed and desired to be secured by Letters Patent of the United States is:

1. A lading-engaging device of the type employed in a lading-carrying vehicle or container having a ceiling, floor and sidewalls, said device including curtain means for engaging said lading and laterally-extening, longitudinally-movable support means adjacent the ceiling of said vehicle or container for supporting and suspending said curtain means, wherein the improvement comprises said device further including means for cooperation with said curtain means and said support means for adjustably suspending said curtain means from said support means relative to said floor and said suspension means includes elongated clip means cooperatively associated and in fixed spatial relation to said support means, said clip means having a plurality of vertically-spaced adjustment apertures; ring means cooperatively associated with said curtain means and positioned in fixed spatial relation thereto, said ring means constructed to be positioned in relation to the apertures of said clip means; and means for releasably securing said ring means to said clip means so as to permit selective positioning of the ring means relative to the clip means and thereby adjust the vertical positioning of the curtain means relative to the support means.

2. A device as in claim 1, wherein said clip means is fabricated of metal and includes a pair of legs for positioning on opposite sides of said curtain means and adapted to be securably fastened to each other with a portion of said curtain means held therebetween so as to inhibit theft of said curtain means.

3. A load-restraining device for use in a lading-carrying vehicle or container to minimize damage to the lading during shipment by engaging an unrestrained face of the lading and restraining the movement of said face and thereby said lading, said device including curtain means for engaging said lading and restraining the movement thereof, restraining belt means cooperatively associated with said curtain and adapted for releasable engagement with vehicle or container sidewalls for cooperation with said curtain in restraining said lading, and laterally-extending, longitudinally-movable support means adjacent the top of said vehicle or container for supporting and suspending said curtain means, wherein the improvement comprises said restraining device, further including:

a pair of corner protecting means, each member of the pair adapted to engage a vertical side edge portion of the lading face adjacent a sidewall for minimizing damage to the lading, each of said corner protecting means comprising:

a rigid, elongated body and means for securing said body to the lading-engaging side of said curtain means, said body being adapted to be positioned between said curtain and said lading adjacent said sidewall for transmitting the forces applied to the protecting means to said curtain means.

4. A load-restraining device as in claim 3, wherein the outer side of the edges of the rigid body is provided with rounded corners.

5. A load-restraining device as in claim 4, wherein the rigid body is of plywood.

6. A load-restraining device as in claim 5, wherein metal flashing means is secured to the lading contacting side of the rigid body for protecting said body from abrasion from localized loads.

7. A load-restraining device as in claim 6, wherein said flashing means is secured to at least the lower half of said rigid body.

8. A load-restraining device for use in a lading-carrying vehicle or container to minimize damage to the lading during shipment by engaging an unrestrained face of the lading and restraining the movement of said face and thereby said lading, said device including curtain means for engaging said lading and restraining the movement thereof, restraining belt means cooperatively associated with said curtain and adapted for releasable engagement with vehicle or container sidewalls for cooperation with said curtain in restraining said lading, and laterally-extending, longitudinally-movable support means adjacent the top of said vehicle or container for supporting and suspending said curtain means, wherein the improvement in said curtain means includes there being further provided end flap means at each vertical side edge of said curtain means for positioning between the lading and each sidewall to minimize lateral movement of the curtain.

9. A load-restraining device for use in a lading-carrying vehicle or container to minimize damage to the lading during shipment by engaging an unrestrained face of the lading and restraining the movement of said face and thereby said lading, said device including curtain means for engaging said lading and restraining the movement thereof, restraining belt means cooperatively associated with said curtain and adapted for releasable engagement with vehicle or container sidewalls for cooperation with said curtain in restraining said lading, and laterally-extending, longitudinally-movable support means adjacent the top of said vehicle or container for supporting and suspending said curtain means, wherein the improvement comprises said lading-carrying vehicle or container being of the type which is constructed to selectively employ movable horizontal decking means to define a lading supporting surface above the floor of the vehicle and said curtain means having a height greater than the distance between the support means and floor of said vehicle, and means on the curtain for adjusting the effective height of the curtain to be substantially equivalent to the distance between the floor and support, so that when decking is not in place the curtain can be employed in the adjusted condition to restrain lading and when decking is in place, the curtain can be positioned rearwardly of the decking and in position to engage lading above and below the decking.

10. A load-restraining device as in claim 9, wherein said adjustment means comprises means for releasably forming a fold across the curtain so as to adjust the height thereof.

11. A load-restraining device as in claim 10, wherein said means for releasably forming a fold comprises hook-like means on said curtain adapted to hookingly engage said curtain in a manner effective to form said fold.

12. A load-restraining device as in claim 11, wherein said hook-like means are positioned on said curtain to engage said curtain in a position above the hook-like means in order to form the fold.

13. A load-restraining device for use in a lading-carrying vehicle or container to minimize damage to the lading during shipment by engaging an unrestrained face of the lading and restraining the movement of said face and thereby said lading, said device including curtain means for engaging said lading and restraining the movement thereof, restraining belt means cooperatively associated with said curtain and adapted for releasable engagement with vehicle or container sidewalls for cooperation with said curtain in restraining said lading, and laterally-extending, longitudinally-movable support means adjacent the top of said vehicle or container for supporting and suspending said curtain means, wherein the improvement comprises said restraining device, further including (a) means for adjustably suspending said curtain means, from said support means relative to said floor;

(b) a plurality of vertically-spaced and laterally-extending belts and a plurality of laterally-extending and vertically-spaced belt-receiving pockets through which said belts extend, each of said pockets being secured to said curtain means on the side thereof opposite said lading-engaging face;

(c) said sidewall engaging means being secured to each end of the belt means and comprising J-shaped hook means with the opening of said hook means adapted for positioning away from the unrestrained lading face; and (d) said curtain means further including end flap means at each vertical side edge of said curtain means for positioning between the lading and each sidewall to minimize lateral movement of the curtain.

14. A load-restraining device as in claim 13, wherein there is further provided:

a pair of corner protecting means, each member of the pair adapted to engage a vertical side edge portion of the lading face adjacent a sidewall for minimizing damage to the lading, each of said corner protecting means comprising:

a rigid, elongated body and means for securing said body to the lading-engaging side of said curtain means, said body being adapted to be positioned between said curtain and said lading adjacent said sidewall for transmitting the forces applied to the protecting means to said curtain means.

* * * * *